United States Patent [19]

Utsugi

[11] Patent Number: 4,633,306
[45] Date of Patent: Dec. 30, 1986

[54] ARRANGEMENT FOR PRODUCING VISUAL IMAGES RECORDED ON A DISK OF FILM

[75] Inventor: Mikio Utsugi, Tokyo, Japan

[73] Assignee: Fuji Photo Film Co., Ltd., Minami-Ashigara, Japan

[21] Appl. No.: 542,395

[22] Filed: Oct. 17, 1983

[30] Foreign Application Priority Data

Oct. 19, 1982 [JP] Japan ................. 57-182170

[51] Int. Cl.$^4$ .................. H04N 5/253; G02B 7/11
[52] U.S. Cl. ........................... 358/102; 358/225
[58] Field of Search ............... 358/102, 93, 225

[56] References Cited

U.S. PATENT DOCUMENTS 4,506,300 3/1985 Fearnside .................. 358/102

Primary Examiner—Howard W. Britton
Attorney, Agent, or Firm—Birch, Stewart, Kolasch & Birch

[57] ABSTRACT

An arrangement for producing visual images recorded on a disk of film includes an imaging system having a solid-state image sensor, which can take a first position where it picks up the whole area of the disk of film, and a second position where it picks up a single frame of image recorded on the disk. A control unit, which is operative in response to manual instructions provided from a keyboard, causes the image sensor to be in its first position during an entire area display mode so that the entire area of the disk will be displayed on a display screen. In an individual frame display mode, the control unit causes the image sensor to be in the second position, in response to a desired frame being designated by the keyboard, so as to display the designated frame on the monitor screen. Video signals developed from the image sensor may be under image processings, such as negative-to-positive inversion, corrections of color balance, and image quality including gradation and tone, in response to information recorded on the disk of film.

15 Claims, 4 Drawing Figures

FIG. I

ARRANGEMENT FOR PRODUCING VISUAL IMAGES RECORDED ON A DISK OF FILM

BACKGROUND OF THE INVENTION

1. Field of the Invention

The present invention relates to an arrangement for producing visual images, and more specifically to such an arrangement for producing visual images which are recorded on a rotary disk-like image recording medium.

2. Description of the Prior Art

Conventionally, there has been provided an image reproduction system including an imaging device such as a television camera for picking up images recorded on a roll of negative film to reproduce them as visual images on a cathode-ray tube display unit. In order to search for a desired frame of image recorded on an elongated roll of film, however, it is required to make the frames of image displayed on the cathode-ray tube screen sequentially one by one, resulting in degrading the operability and utility of the system.

A rotary disk-like image recording medium such as a disk of film has been developed which includes a circular photosensitive film on which a plurality of frames are to be recorded in the circumferential direction of the disk around the core or hub supporting the photosensitive film. Even in the case of such a disk of film, since the disk has a number of frames recorded thereon, it requires a long period of time and complicated operations to search for a desired frame of image during a sequential display of the frames on the cathode-ray tube screen.

SUMMARY OF THE INVENTION

It is therefore an object of the invention to provide an arrangement for producing visual images recorded on a disk of film, by which a desired frame of image can be searched for with high operability and short response time.

In accordance with the present invention, an arrangement for producing visual images recorded on an image recording medium comprising, supporting means for detachably supporting a rotary disk-like image recording medium having frames of visual image recorded thereon, first driving means for driving said supporting means to rotate the image recording medium, image visualizing means interconnected to said imaging means for visualizing the video signals as a reproduced image, control means, and input means interconnected to said control means for receiving instructions, said imaging means being adapted to selectively take a first status, in which said imaging means picks up a relatively broader area of the image recording medium, and a second status, in which said imaging means picks up a relatively smaller area of the image recording medium, said control means being operative in response to the first status instructed by said input means to control said imaging means into the first status, and in response to a desired frame recorded on the image recording medium being designated by said input means to control said imaging means into the second status, said first driving means to rotate the image recording medium so that the designated frame is transported to an imaging position where the designated frame is imaged by said imaging means.

BRIEF DESCRIPTION OF THE DRAWINGS

The objects and features of the present invention will become more apparent from a consideration to the following detailed description taken in conjunction with the accompanying drawings in which.

DESCRIPTION OF THE PREFERRED EMBODIMENTS

Figure 1:
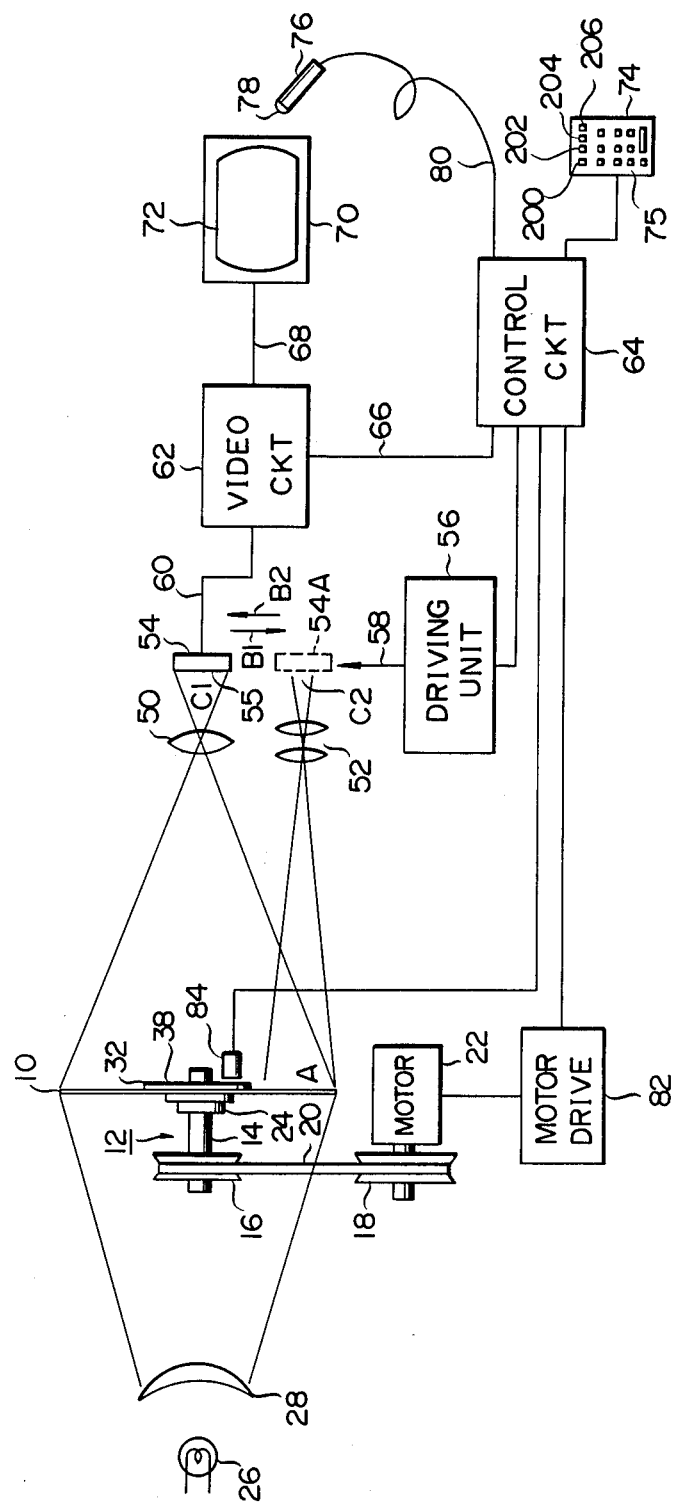
FIG. 1 is a schematic block diagram showing an embodiment of an arrangement for producing visual images recorded on a disk of film in accordance with the present invention.

Now referring to FIG. 1, an embodiment of an image producing arrangement in accordance with the present invention includes a film disk supporting mechanism, indicated generally by a reference numeral 12, by which a disk of film 10 may detachably be supported. Supporting mechanism 12 has a rotary shaft 14, which is driven in revolution by an electric motor 22 by way of two pulleys 16 and 18, and belt 20 running around the pulleys. Leftwards in the figure, there is provided an appropriate light source 26 emitting light, which in turn comes through a condensing lens 28 such as a Fresnel lens to the entire surface of the disk of film 10. Condenser lens 28 may advantageously have a relatively longer focal length so as not to project the shadows of the driving mechanism such as of belt 20 onto the disk of film 10.

Figure 2:
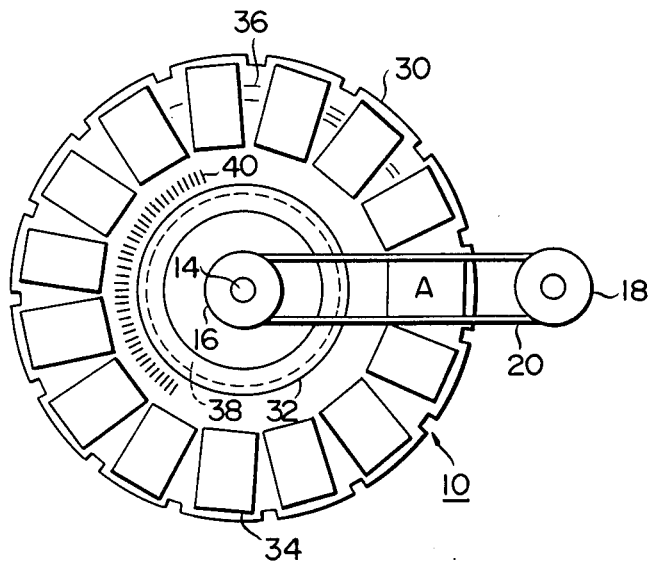
FIG. 2 shows in a plan view of a disk of film included in the arrangement shown in FIG. 1, together with the members associated therewith, depicted as viewed from the left of FIG. 1.

In the illustrative embodiment, the disk of film 10 is employed as an example of a rotary disk-like image recording medium, and the present invention is however not restricted thereto. The disk of film 10 is depicted in a plan view of FIG. 2, as viewed from the left in FIG. 1. Film disk 10, which may detachably be supported on a supporting member 24 afixed to a rotary shaft 14, includes a circular, color negative film 30 having a diameter of approximately 65 millimeters, and a core or hub 32 molded of a synthetic resin for supporting film 30 on its center, in the present embodiment.

On photosensitive film 30, fifteen frames of image 34 can be recorded in the illustrative embodiment. In association with each of frames 34, visual indications 36 such as bar codes and/or numeric symbols may be provided which represent information particular to the respective frames of image 34, such as the number of a frame, for example. Core 32 serves to support film 30 by mechanically coupling with supporting member 24. The peripheral portion of core 32 have a magnetic recording strip 38 provided in concentric therewith on the back surface thereof to form a magnetic recording strip including a magnetic substance, as depicted by the phantom line in FIG. 2.

In magnetic strip 38, information may advantageously be recorded which includes data particular to a specific disk of film 10, such as an identification number, a lot number, a manufacturing place and date, as well as data particular to the respective frames of image 34 in association therewith, for example. Such information may also be indicated by visual indications such as bar codes, numerals, letters, marks, etc. As can be seen from FIG. 2, belt 20 is disposed running between the adjacent frames in order to clearly pass the light coming from light source 26 to a frame 34 without interruption.

Now returning to FIG. 1, the imaging system of the embodiment includes two optical systems, one of which 50 has a lens system for picking up a relatively broader area of the disk of film 10, such as of the entire area of disk 10, and the other of which 52 has a lens system having a relatively higher magnification for picking up a relatively smaller area of disk 10, such as of a single frame 34 brought to a specific position A, for example. The specific position A is hereinafter referred to as an imaging position. In addition, another lens system may advantageously be provided which can pick up a part of a single frmae 34 into an enlarged image.

On a focal plane of lens system 50 or 52 opposite to the disk of film 10, a solid-state imaging device 54 is arranged, which may be a charge transfer device, such as charge-coupled device, bucket brigade device or charge priming device, with its array of photosensitive cells 55 included in the focal plane. A conventional television camera employing an image pickup tube may of course be applicable alternatively to such solid-state image sensors.

Imaging device 54 is supported by supporting means, which is transportable in response to a driving unit 56 in both directions indicated by the arrows B1 and B2 so as to selectively take positions C1 and C2, at which the images of entire disk 10 and a single frame 34 are formed, respectively. The arrow 58 shows symbolically such a mechanically supporting and driving mechanism. In FIG. 1, a phantom line 54A indicates imaging device 54 when located at the position C2.

Imaging device 54 is interconnected by a connection 60 to video circuitry 62, which produces clocks to imaging device 54 and receives time-serial video signals developed from imaging device 54 in response to the clocks in a raster scanning fashion. Video circuitry 62, which is controlled via control line 66 by control circuitry 64, is responsive to synchronous signals formed from system clocks generated in control circuitry 64 to destribute them to imaging device 54 over connection 60 and to a display unit 70 over connection 68.

Video circuitry 62 also serves to amplify the video signals provided from image sensor 54 to form composite television signals to produce them to display unit 70. In the case of a negative type disk of film 10 used, video circuitry 62 may advantageously include a negative-to-positive inversion circuit which inverts electric signals representative of a negative image into electric signals representative of a corresponding positive image, which will later be discussed in detail with reference to FIG. 3. It is to be noted that those constituent elements such as imaging device 54, video circuitry 62 and display unit 70 may naturally be so designed as to deal with color signals.

Display unit 70 may be an image display device such as having a cathode-ray tube including a screen 72 on which the images carried on the disk of film 10 are to be visualized.

Control circuitry 64 controls the general operations of the entire system, and is interconnected to a keypad 74 equipped with ten numeral keys 75 and unsophisticated function keys 200, 202, 204 and 206, as well as a light pen 76. Keypad 74 is an input device for entering into the system input information such as the number of a frame 34, for example. Alternatively to keypad 74, a keyboard may be connected which includes alphanumeric keys and sophisticated function keys, as described later with reference to FIG. 3. Light pen 76, which may be a conventional one, includes a top portion equipped with a photosensitive device 78 which can respond to a bright spot, or pixel, indicated in a raster on display screen 72 to produce electrical signals associated with the sensed dot over connection 80 to control circuitry 64. Control circuitry 64 identifies the timing of the signals received from light pen 76 to determine the position of the bright dot on which top portion 78 of light pen 76 is located.

Control circuitry 64 controls two drive circuits 56 and 82 to transport imaging device 54 in the directions indicated by arrows B1 and B2, and to drive motor 22 to rotate the disk of film 10. On a magnetic strip 38 provided on core 32 of the disk of film 10, there is disposed an electromagnetic transducer or head 84, which is interconnected to control circuitry 64. Control circuitry 64 may sense by means of magnetic head 84 the information recorded on magnetic recording strip 38. Magnetic head 84 may be adapted to record output information fed from control circuitry 64 on recording strip 38. It is to be noted that, alternative to or in addition to magnetic head 84, a photosensitive device, not shown, may be arranged in the visinity of visual indications 36 and/or 40 on the disk of film 10 to optically sense those indications to produce electrical signals associated therewith to control circuitry 64. Alternatively to the provision of such a photosensitive device, control circuitry 64 may advantageously include image processing functions for processing the image signals received from imaging device 54 to identify the information contained in visual indications 36 and 40.

In operation, suppose that a whole image display key 200 of keypad 74 is now actuated to designate a whole image display mode of operation in control circuitry 64. Control circuitry 64 in turn causes driving unit 56 to transport imaging device 54 to the position C1. Then, the entire image of the disk of film 10 is sensed by imaging device 54 through lens system 50. The video signals representative of the entire image of the disk of film 10 will be transferred to be processed in video circuitry 62 to be inverted into video signals of the corresponding positive image, which is ultimately displayed as a visual image on screen 72 of display unit 70.

The operator then applies the top portion 78 of light pen 76 to an appropriate frame image of the disk presently displayed on screen 72, or enters the number designating a desired frame 34 of the disk of film 10. In response, control circuitry 64 identifies the designated number of frame 34, and shifts the mode of operation to its individual frame display mode. For this aim, keypad 74 may be provided with a specific function key, such as an individual frame display key 202, in response to which control circuitry 64 shifts its operation mode to the individual frame display mode.

During the individual frame display mode, control circuitry 64 controls driving unit 56 so as to transport image sensor 54 to the position C2. Control circuitry 64 senses the identification data indicative of a specific frame 34, which is recorded on magnetic strip 38 and supplied through magnetic head 84 to identify the specific frame which presently takes the imaging position A. Control circuitry 64 causes motor 22 to revolve the disk of film 10 until a specific frame designated by means of light pen 76 or keypad 74 reaches the position A. The image of frame 34 which now is located in position A is picked up through lens system 52 by image sensor array 55 of imaging device 54 that is now brought to the position C2. The video signals representative of the frame of image located at the position A is inverted into the video signals representative of the corresponding positive image by video circuitry 62, the inverted image beaing displayed on screen 72 of display unit 70.

Subsequently, the operator may designate another frame 34 by means of keypad 74 or light pen 76. Control circuitry 64 causes in turn the disk of film 10 to be rotated in the same manner discussed above to bring a designated frame 34 to the imaging position A so as to display it on display screen 72. In the illustrative embodiment, keypad 74 is equipped with specific purpose function keys 204 and 206; the former 204 is an increment key which, when actuated, causes control circuitry 64 to control motor 22 to rotate the disk of film 10 by an angle corresponding to a single frame in the forward direction to show the next frame on display screen 72, and the latter 206 is a decrement key which, when operated, to cause control circuitry 64 to control motor 22 to revolve the film disk 10 by the angle corresponding to a single frmae in the backward direction to indicate the previous frame on display screen 72.

In the case of a stepping motor used as motor 22, the system is so designed as to identify a specific frame by counting the driving pulses for the stepping motor, or by sensing the position of the frames in response to supporting mechanism 12, in alternative to the sensing by magnetic head 84.

Figure 3:
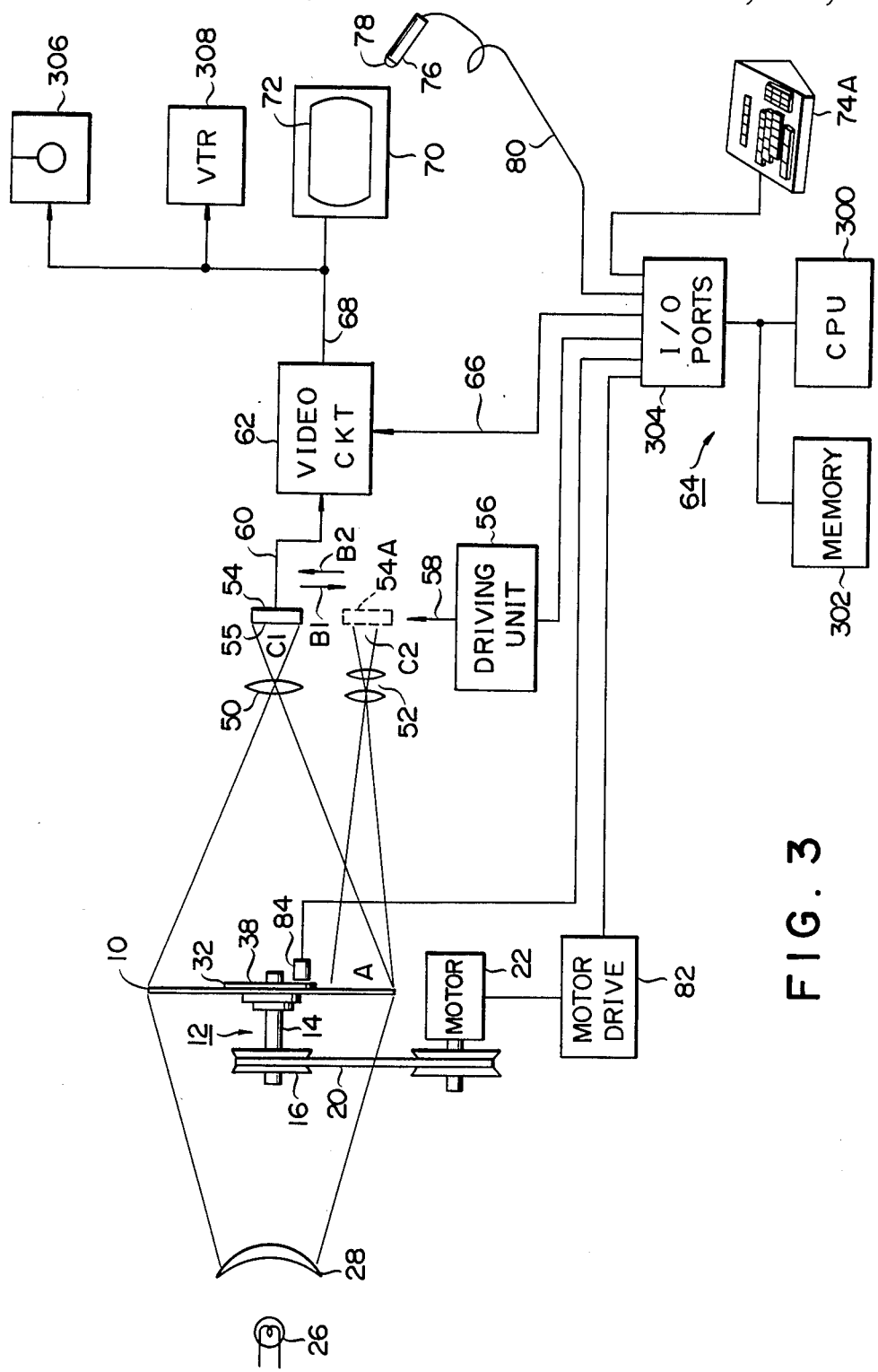
FIG. 3 is a schematic block diagram, similar to FIG. 1, showing another embodiment of the invention.

With reference to FIG. 3, another embodiment of the present invention will be discussed. In the figure, like components as appearing in FIG. 1 are designated by the same reference numerals, and redundant description will be aboided only for simplicity.

The embodiment shown in FIG. 3 is directed to an image reproduction system with image processing features such as correction or modification of color balance and image quality including gradation and tone, as well as negative-to-positive image inversion. For this purpose, the system shown in FIG. 3 is provided with a processor system, as control circuitry 64, which includes a central processor unit 300, a memory 302, and input/output ports 304, to which a commercially available microprocessor system may advantageously applicable. Driving circuits 56 and 82, magnetic head 84, video circuitry 62, and light pen 76 are served by input/output ports 304, as illustrated in the figure. Alternative to keypad 74 included in the embodiment shown in FIG. 1, a more sophisticated keyboard or console 74A is interconnected to input/output ports 304. By means of console 74A, one is able to designate a specific, desired frame involved in a disk of film 10, and control the image processing over the color balance, gradation and tone corrections, for example.

The system shown in FIG. 3 further includes an image storage system such as a magnetic disk system 306 and a video tape recorder 308, which are interconnected to video circuitry 62 to store video signals representative of images carried on a disk of film 10, in the form of analog image signals, for example.

To the image producing system shown in FIG. 3, applicable is a disk of film of the type which has magnetic strip 38 on which data is recorded in the form of digital signals, which data includes parameters for correcting color balance and image quality associated with the respective frames of image. Such data may be stored in advance by a separate image processing system by taking account of picture patterns of respective frames, and conditions on lighting and developing process thereof, for example.

Upon loading such a disk of film 10, processor 300 senses by magnetic head 84 the data recorded on magnetic strip 38 to temporarily store them in memory 302 with the identification of the disk 10 and the frame number used for a key index. In response to keying operations on console 74A to select a specific frame of the disk of film 10, central processor 300 controls driving circuits 82 and 56 so that imaging device 54 picks up the image of the thus designated frame on the disk 10. The video signals indicative of that frame are in turn processed by video circuitry 62. Simultaneously, processor 300 reads out the correction data from memory 302 to transfer it to video circuitry 62. In response to the correction data thus transferred, video circuitry 62 processes the video signals received from imaging device 54 to produce video signals that are corrected in color balance and image quality to monitor display 70. The operator may manipulate console 74A to further modify the color balance, gradation and/or tone while watching the image displayed on the monitor screen 72. The thus appropriately adjusted image, which is now displayed on monitor screen 72, will be transferred, in response to manual operation on console 74A, to magnetic disk 306 and/or video tape recorder 308 to be stored therein in the form of analog video signals, for example.

Figure 4:
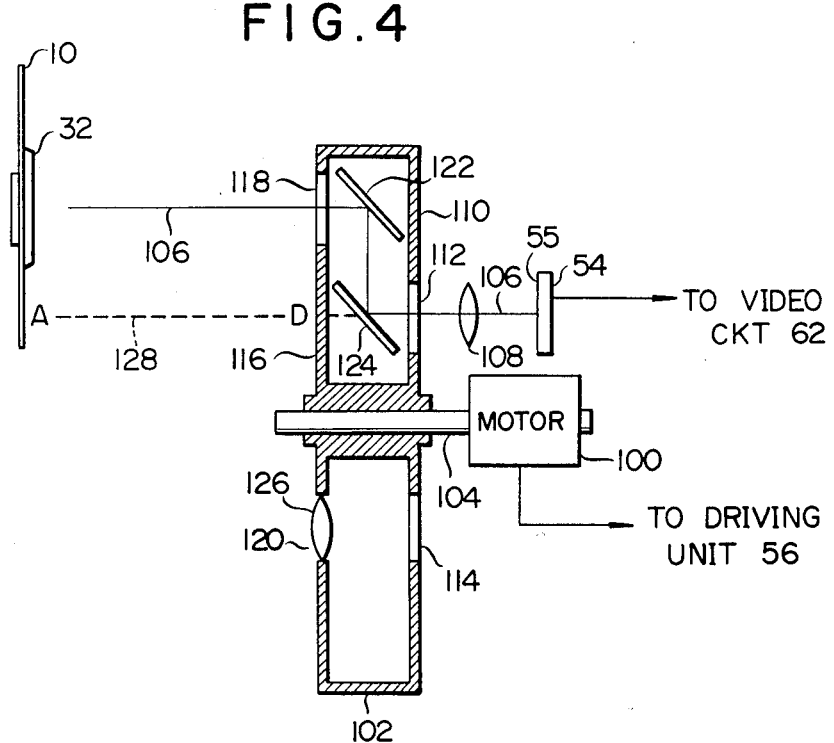
FIG. 4 illustrates a part of an alternative embodiment of the present invention.

FIG. 4 shows a part of another embodiment which is an alternative to a part of the embodiments shown in FIGS. 1 and 3. The remaining portion may be the same in system configuration. In this alternative embodiment, an additional motor 100, which is driven by driving unit 56, is mechanically linked with a turret-like rotary member 102. More in detail, rotary member 102 is depicted in FIG. 4 in cross section cut in parallel with driving shaft 104 of motor 100, and has a circular shape when viewed from the right and left directions in the figure, that is, rotary member 102 has a flat, thin cylindrical shape, and the central portion thereof is mounted on rotary shaft 104 of motor 100 to rotate thereabout.

Imaging device 54 is fixed at a predetermined position, and not movable as in the embodiments shown in FIGS. 1 and 3. Above photosensitive array 55, there is disposed a lens system 108 having its optical axis projected substantially perpendicularly onto the center of array 55.

Rotary member 102 is a hollow cylinder which is thin in its longitudinal direction. Hollow cylinder 102 has an end plate 110 facing to lens system 108. End plate 110 has two openings 112 and 114, which may be circular, and are provided in the same distance from output shaft 104 of motor 100 so as to include optical path 106 therein.

The other end plate 116 of hollow-cylinder 102 that is opposite to lens system 108 has also two openings 118 and 120, which may also be circular. One of the openings 118 is disposed at the position that is substantially coincident with the center of a disk of film 10, which is supported by supporting mechanism 12. Inside hollow cylinder 102, there are disposed two mirrors 122 and 124, which are arranged to introduce the optical path 106 from the film disk 10 to lens system 108 as shown in FIG. 4. The whole image of the disk of film 10 can therefore be imaged onto the photosensitive array 55 of image sensor 54. When rotary member 102 is oriented as shown in FIG. 4, imaging device 54 is ready to pick up the entire image of the disk of film 10 loaded to supporting mechanism 12.

The other opening 120 is located at the corresponding position of hole 114, and equipped with a lens system 126. When rotary member 102 rotates driven by motor 100 to bring lens system 126 into the position D, the optical path 106 runs straight from lens system 108 through opening 114 and lens system 126 to the imaging position A, as depicted by a phantom line 128. Lens system 108 is optically combined with lens system 126 so as to establish a higher magnification to take the image of a single frame which is now positioned at A. Image sensor 54 will then produce video signals representative of the image of the single frame rather than the whole image of the disk of film 10.

With the alternative embodiment shown in FIG. 4, driving unit 56 is not mechanically linked with imaging device 54 by way of transport mechanism 58 as in the first embodiment shown in FIG. 1, but is operably associated with turret-like rotary member 102 that can be driven in revolution by motor 100 which is energized by driving unit 56. In the entire image display mode, therefore, control circuitry 64 controls motor 100 to bring rotary member 102 to the angular position depicted in FIG. 4 so as for the entire image of the disk of film 10 to be projected onto the photosensitive array 55 via mirrors 122 and 124, and lens system 108. In the individual frame display mode, control circuitry 64 causes motor 100 to rotate rotary member 102 so as to bring lens system 126 to the position D, resulting in the image of a frame which is now in the imaging position A being projected onto the image sensor array 55 by a combination of lens system 108 with lens system 126.

While the present invention has been described in terms of specific illustrative embodiments, it is to be understood to be susceptible to modification by those skilled in the art within the spirit and scope of the appended claims.

What is claimed is:

1. An arrangement for producing visual images recorded on an image recording medium comprising:
   supporting means for detachably supporting a rotary disk-like image recording medium having frames of visual images recorded thereon;
   first driving means for driving said supporting means to rotate the image recording medium;
   imaging means for imaging the image recording medium to produce video signals associated therewith;
   image visualizing means interconnected to said imaging means for visualizing the video signals as a reproduced image;
   control means; and
   input means interconnected to said control means for receiving instructions;
   said imaging means being adapted to selectively take a first status, in which said imaging means picks up a relatively broader area of the image recording medium including the entire area of the image recording medium, and a second status, in which said imaging means picks up a relatively smaller area of the image recording medium including a frame of images recorded on the image recording medium;
   said control means being operative in response to the first status instructed by said input means to control said imaging means into the first status, and in response to a desired frame recorded on the image recording medium being designated by said input means to control said imaging means into the second status, said control means controlling, in the second status, said first driving means to rotate the image recording medium so that the designated frame is transported to an imaging position where the designated frame is imaged by said imaging means.

2. An arrangement in accordance with claim 1, wherein said input means comprises a light pen operatively connected to said control means for selectively designating any one of the frames of image which are displayed on said visualizing means.

3. An arrangement in accordance with claim 1, wherein said input means comprises first key means for selecting a plurality of frames of image which are recorded on said image recording medium, and second key means for selecting the first and second statuses.

4. An arrangement in accordance with claim 1, further comprising image storage means interconnected to said image visualizing means for storing the video signals.

5. An arrangement in accordance with claim 1, wherein said image recording medium carries thereon information on identifications of the respective frames of image recorded thereon;
   said arrangement further comprising reading means for reading the information recorded on the image recording medium to provide said control means therewith;
   said control means being operative in response to the readout information to cause said first driving means to bring a designated frame of image to the imaging position.

6. An arrangement in accordance with claim 5, wherein said image recording medium comprises a disk of film, on which the information is visually recorded, said arrangement further comprising photosensitive means interconnected to said control means for photoelectrically reading out the information to supply said control means with the readout information.

7. An arrangement in accordance with claim 5, wherein said image recording medium comprises a disk or film, on which the information is magnetically recorded, said arrangement further comprising electromagnetic means interconnected to said control means for electromagnetically reading out the information to supply said control means with the readout information.

8. An arrangement in accordance with claim 1, wherein said image recording medium carries thereon information on image processing conditions associated with the frames of image recorded on the image recording medium;
   said arrangement further comprising reading means for reading the information recorded on the image recording medium to provide said control means therewith;
   said control means being operative in response to the readout information to cause said image visualizing means to process the video signals in accordance with the image processing conditions contained in the information.

9. An arrangement in accordance with claim 8, further comprising image storage means interconnected to said image visualizing means for storing the video signals on which the image processing was made by said image visualizing means.

10. An arrangement in accordance with claim 8, wherein said image recording medium comprising a disk of film, on which the information is visually recorded, said arrangement further comprising photosensitive means interconnected to said control means for photoelectrically reading out the information to supply said control means with the readout information.

11. An arrangement in accordance with claim 8, wherein said image recording medium comprising a disk of film, on which the information is magnetically recorded, said arrangement further comprising electromagnetic means interconnected to said control means for electromagnetically reading out the information to supply said control means with the readout information.

12. An arrangement in accordance with claim 8, wherein said image recording medium comprises a disk of film of a negative type, the image processing made in said image visualizing means includes negative-topositive inversion of images.

13. An arrangement in accordance with claim 12, wherein the image processing made in said image visualizing means includes corrections of color balance and image quality including gradation and tone.

14. An arrangement for producing visual images recorded on an image recording medium comprising:
supporting means for detachably supporting a rotary disk-like image recording medium having a frames of visual images recorded thereon;
first driving means for driving said supporting means to rotate the image recording medium;
imaging means for imaging the image recording medium to produce video signals associated therewith, said imaging means including,
a first lens system for imaging a relatively broader area of the image recording medium,
a second lens system for imaging a relatively smaller area of the image recording medium which is positioned at the imaging position,
an imaging device having an array of photosensitive cells, and
second driving means for selectively positioning said imaging device at a first position where the photosensitive array is contained in a focal plane of said first lens system, and at a second position where the photosensitive array is contained in a focal plane of said second lens system;
imaging visualizing means interconnected to said imaging means for visualizing the video signals as a reproduced image;
control means; and
input means interconnected to said control means for receiving instructions;
said imaging means being adapted to selectively take a first status, in which said imaging means picks up a relatively broader area of the image recording medium, and a second status, in which said imaging means picks up a relatively smaller area of the image recording medium;
said control means being operative in response to the first status instructed by said input means to control said imaging means into the first status, and in response to a desired frame recorded on the image recording medium being designated by said input means to control said imaging means into the second status, said control means controlling, in the second status, said first driving means to rotate the image recording medium so that the designated frame is transported to an imaging position where the designated frame is imaged by said imaging means, said control means being operative in response to the first status to cause said second driving means to bring said imaging device to the first position, and in response to the second status to cause said second driving means to bring said imaging device to the second position.

15. An arrangement for producing visual images recorded on an image recording medium comprising:
supporting means for detachably supporting a rotary disk-like image recording medium having frames of visual images recorded thereon;
first driving means for driving said supporting means to rotate the image recording medium;
imaging means for imaging the image recording medium to produce video signals associated therewith, said imaging means including,
an imaging device which is stationary with respect to said supporting means,
rotary supporting means for supporting first and second optical systems, and
third driving means for rotating said rotary supporting means,
said rotary supporting means being adapted to selectively take a third position, where the first optical system is arranged to introduce an image of relatively broader area of the image recording medium to said imaging device, and a fourth position, where the second optical system is arranged to introduce to said imaging device an image of the smaller area of the image recording medium which is positioned at the imaging position;
image visualizing means interconnected to said imaging means for visualizing the video signals as a reproduced image;
control means; and
input means interconnected to said control means for receiving instructions;
said imaging means being adapted to selectively take a first status, in which said imaging means picks up a relatively broader area of the image recording medium, and a second status, in which said imaging means picks up a relatively smaller area of the image recording medium;
said control means being operative in response to the first status instructed by said input means to control said imaging means into the first status, and in response to a desired frame recorded on the image recording medium being designated by said input means to control said imaging means into the second status, said first driving means to rotate the image recording medium so that the designated frame is transported to an imaging position where the designated frame is imaged by said imaging means, said control means controlling said third driving means to bring said rotary supporting means to the third position in response to the first status, and into the fourth position in response to the second status.

* * * * *